United States Patent Office 3,549,318
Patented Dec. 22, 1970

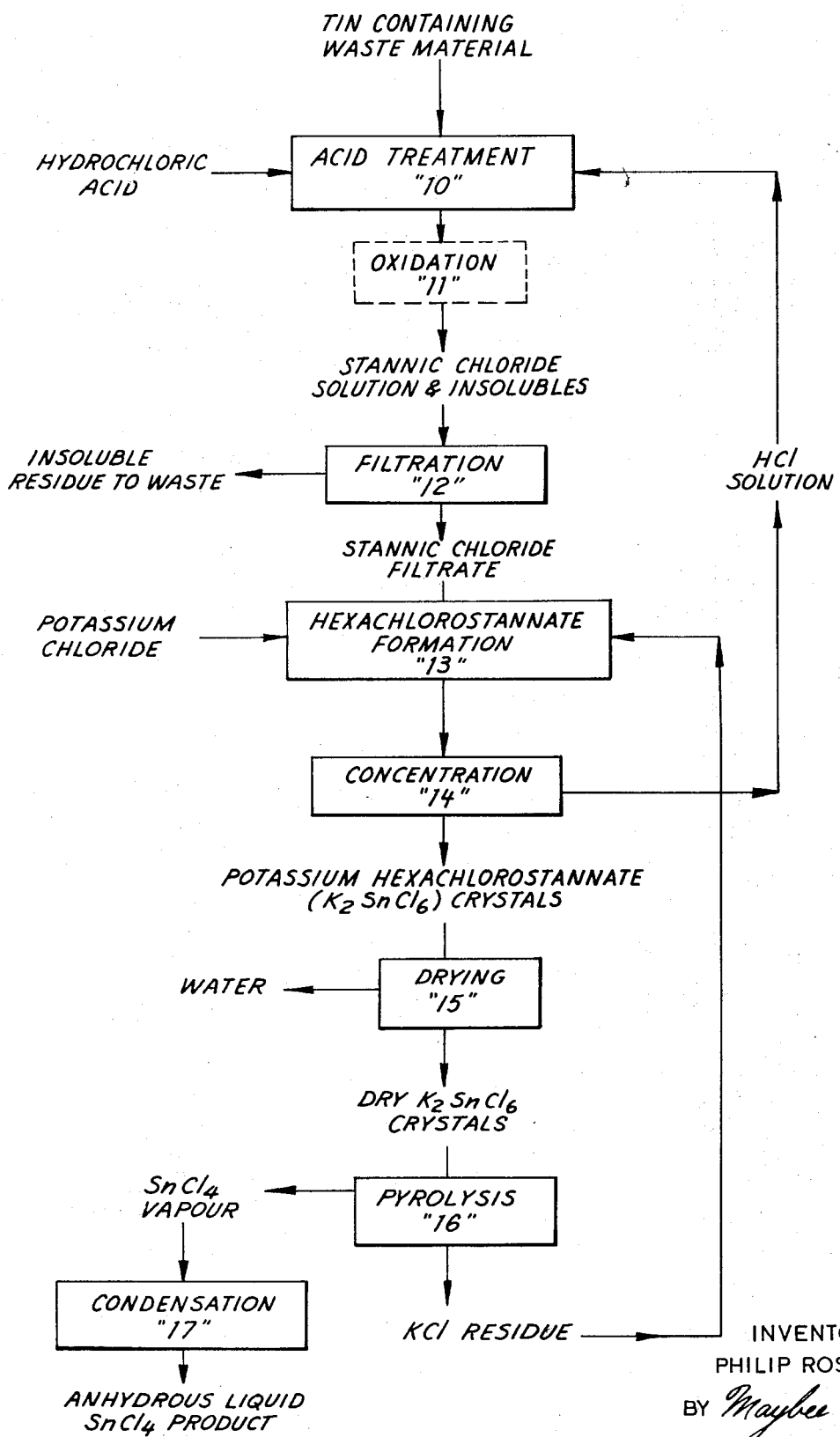

3,549,318
PRODUCTION OF TIN TETRACHLORIDE
Philip Rosenblum, Downsview, Ontario, Canada, assignor to M&T Products of Canada Limited, Hamilton, Ontario, Canada, a company
Filed Jan. 17, 1969, Ser. No. 792,092
Int. Cl. C01g *19/04, 19/08*
U.S. Cl. 23—98
17 Claims

ABSTRACT OF THE DISCLOSURE

A process for recovering anhydrous tin tetrachloride from a solution of stannic chloride by reacting the stannic chloride in solution with potassium chloride to form potassium hexachlorostannate, recovering the hexachlorostannate as dry crystals, pyrolyzing the crystals to form tin tetrachloride and condensing the tetrachloride to form liquid anhydrous tin tetrachloride.

BACKGROUND OF THE INVENTION

In many commercial processes involving the use of tin or tin-containing compounds residues or scrap materials remain therefrom which, for economic reasons, must be treated for recovery of their tin content. Usually the tin must be recovered by expensive smelting procedures or by involved chemical treatment and, heretofore, no simple procedure has been evolved for treating these materials. It would be most convenient to be able to recover the tin in the form of easily volatilized tin tetrachloride but $SnCl_4$ must be in the anhydrous form in order to be useful, e.g., in treating glass bottles and in preparation of organo-tins by Grignard synthesis. Recovery of $SnCl_4$ in the anhydrous form is, however, a most difficult task.

In U.S. Pat. No. 1,737,140 tin wastes are treated with hot hydrochloric acid containing a non-oxidizing salt to form stannous chloride solution and the solution is treated with lime to precipitate the tin from solution. The tin oxide precipitate must then be treated for recovery of metallic tin. In U.S. Pat. No. 2,345,210 tin oxide bearing ores are treated with gaseous chlorine in the presence of a reducing agent to form tin tetrachloride, which is condensed and recovered. Other volatilizable chlorides are formed by the very reactive chlorine, however, and the various chlorides formed must be fractionally condensed. Neither of these patents discloses the formation alone and recovery of anhydrous tin tetrachloride by simple solution chemistry.

SUMMARY

In the process of the invention a solution of stannic chloride is reacted with potassium chloride to form a solution of potassium hexachlorostannate. Rubidium chloride or cesium chloride may be substituted for potassium chloride. The hexachlorostannate is removed and recovered as crystals from the solution which are are dried and heated at above 450° C. to pyrolyze the same. Tin tetrachloride is driven off as a vapour during the pyrolysis and is condensed and recovered as a liquid, anhydrous material, while potassium chloride remaining from the pyrolysis is recovered for re-use in the process.

It is an object of the invention to treat stannic chloride containing solutions by a novel and simple chemical processing procedure to recover tin therefrom in an easily marketable and usable form.

A further object of the invention is to provide a novel process for recovering liquid, anhydrous tin tetrachloride from a solution of stannic chloride.

Other objects and advantages of the invention will be apparent from the description following taken in conjunction with the accompanying drawing.

BRIEF DESCRIPTION OF THE DRAWING

The drawing shows a flowsheet illustrating a process embodying the invention in which tin-containing waste material is treated for recovery of anhydrous, liquid tin tetrachloride therefrom.

DESCRIPTION OF THE PREFERRED EMBODIMENTS

Generally speaking, the invention relates to a process for treating waste materials containing tin in oxidized form and/or metallic tin. Such a waste material results, for example, from a detinning operation in which an impure solution of sodium stannate is formed and the tin is removed as impure hydrated tin oxide which is treated by the novel process of the invention. Actually, any waste material containing tin in a form which can be dissolved in hydrochloric acid can be treated.

Broadly speaking then, the invention involves the processing of stannic chloride-containing aqueous solutions for removal of water therefrom and recovery of anhydrous stannic chloride ($SnCl_4$).

The stannic chloride-containing solution to be treated (hereinafter referred to as the first solution) is reacted with a chloride of a metal from the group comprising potassium, rubidium and cesium to form a second solution containing hexachlorostannate of potassium, rubidium or cesium. Preferably, the metal chloride is added in excess of that required to react with all the stannic chloride present in the first solution. The hexachlorostannate is removed as crystals from the second solution. Pyrolysis of the crystals by overheating is avoided at this stage of the process. The hexachlorostannate crystals removed from the solution are thoroughly dried, if necessary, to remove any water present, after which they are heated and pyrolyzed in the dry state at above about 450° C. to form tin tetrachloride (stannic chloride) vapour therefrom and leave a residue of potassium chloride, or rubidium chloride or cesium chloride if either of these chlorides was used in the process. The tin tetrachloride vapour is condensed to form a porduct of anhydrous, liquid tin tetrachloride.

The first solution of stannic chloride is generally formed by treating an impure tin-containing material with hydrochloric acid, preferably in excess of that required to react with all the tin present. If the material being treated with hydrochloric acid contains metallic tin a solution of stannous chloride is obtained and the stannous chloride must be first oxidized to stannic chloride before the process can be proceeded with.

Referring to the flowsheet, acid treatment "10" of a tin-containing waste material is advantageously conducted using hot hydrochloric acid in amounts which are at least 10% in excess of that required to fully react with the tin in order to provide as rapid a reaction as possible. An excess of about 40% hydrochloric acid has been found to be very effective. If stannous chloride is formed by the presence of metallic tin in the waste material the stannous chloride is oxidized in oxidation "11" such as by boiling the solution and agitating it with air and adding hydrogen peroxide, if necessary. Some insolubles usually remain from the acid treatment "10" and these are removed by filtration "12" from the first solution of stannic chloride solution which has been formed, with the insoluble residue being discarded as waste. The stannic chloride filtrate, usually containing excess hydrochloric acid, is treated with potassium chloride in operation "13" to form potassium hexachlorostannate ($K_2SnCl_6$) therein. As aforementioned, rubidium chloride or cesium chloride may be used instead to form rubidium hexachlorostannate ($Rb_2SnCl_6$) or cesium hexachlorostannate ($Cs_2SnCl_6$), although such procedure would be less economical under present availability of the chlorides of rubidium and cesium. In any case, reference hereinafter to the use of potassium chloride will be taken to include the use of ribidium chloride or cesium chloride.

The hexachlorostannate formation "13" is advantageously carried out using as much as about 50% excess potassium chloride over that required to react with all the stannic chloride in solution since faster reaction and subsequent crystallization results therefrom. Some formation of solid potassium hexachlorostannate crystals will occur at this stage, depending on the amount of potassium chloride used. In any case, concentration "14" of the solution is carried out, such as by evaporation, to cause precipitation of $K_2SnCl_6$ crystals, with substantially complete precipitation being desirable. Excessive temperatures are avoided during the evaporation so that pyrolysis of $K_2SnCl_6$ can be prevented at this stage in the process. Evaporation should not be carried out at above 400° C. and advantageously at not above about 300° C. Any hydrochloric acid remaining from the concentration operation "14" can be recycled for re-use on further tin-containing material in the acid treatment "10."

It is to be noted that if rubidium chloride or cesium chloride is used the hexachlorostannate crystals are formed immediately and no concentration of the solution is necessary to induce crystallization.

Any moisture in the $K_2SnCl_6$ crystals must be removed therefrom in drying operation "15" and the drying should also be carried out while avoiding pyrolysis of the crystals. As aforementioned, the $K_2SnCl_6$ crystals are heated in the completely dry state at above 450° C. in operation "16" to pyrolyze the same and form $SnCl_4$ vapour while leaving a potassium chloride residue. The pyrolysis "16" may be carried out at up to about 700° C. and preferably a temperature of about 540° C. should be used. It has been found that recovery of $SnCl_4$ from the $K_2SnCl_6$ crystals is usually improved by increasing the pyrolyzing temperature in stages up to 700° C. with nearly 100% recovery being possible by this procedure. Heating directly at 700° C. is found to usually cause too rapid evolution of tin tetrachloride from the $K_2SnCl_6$ crystals.

A residue of potassium chloride remains from the pyrolysis and this residual KCl can be recycled for re-use in formation of further $K_2SnCl_6$ in the process, advantageously by dissolving the residue in water and using the solution for reaction with further stannic chloride solution. The volatilized $SnCl_4$ is condensed in operation "17," such as by passing through cooling coils, and is recovered as an anhydrous, liquid tin tetrachloride product which can be packed in drums without danger of corrosion, a danger which is attendant with $SnCl_4$ containing any moisture.

For the purpose of giving those skilled in the art a better understanding of the invention the following illustrative examples are given:

EXAMPLE I 80.5 grams (g.) of hydrated tin oxide (25 g. tin by analysis) were mixed and heated in a tank with 150 millilitres (ml.) of 37% hydrochloric acid to almost complete solution and the resulting stannic chloride-containing solution was filtered. 47 g. of potassium chloride dissolved in 150 ml. of water were added to and mixed with the solution to form a $K_2SnCl_6$ solution. This latter solution was treated in a crystallizer evaporator unit where excess water and hydrochloric acid were evaporated and $K_2SnCl_6$ crystals were formed. The crystal-containing solution was pumped to a centrifuge where the crystals were separated from the residual liquor and this liquor was returned for re-use in the $K_2SnCl_6$ formation step. The $K_2SnCl_6$ crystals which were thoroughly dried at 110° C., weighed 62.7 g., representing 72.5% of the tin in solution and analyzed 28.92% Sn, 28.98% being theoretical. The crystals were fed to a pyrolyzer and heated to between 450 and 500° C. Anhydrous tin tetrachloride was distilled off which was passed through cooling coils, condensed and collected as an anhydrous, liquid $SnCl_4$ product. The $SnCl_4$ collected weighed 36.5 g. and analyzed 44.8% Sn, 45.53% being theoretical. This represented 90% of the tin in the hexachlorostannate. The residue of KCl remaining from the pyrolysis was dissolved in water and returned to the acid treatment tank for re-use.

EXAMPLE II

In this example sludge from a tin plating bath using an acid solution of stannous sulphate as the plating medium (the so-called Ferrostan plating bath) was treated for recovery of tin contained therein. 100 g. of this sludge containing 54% tin was dissolved in 300 ml. of 37% hydrochloric acid and the stannic chloride-containing solution formed was filtered. Analysis showed that substantially all the tin in the sludge dissolved in the acid. 100 g. of potassium chloride dissolved in 300 ml. of water was added to the acid solution to form $K_2SnCl_6$ and the resulting solution was evaporated to a small volume to form crystals of $K_2SnCl_6$ which were filtered off. The crystals when dried weighed 174 g. and analyzed 28.0% Sn against the theoretical content of 28.98% in $K_2SnCl_6$. This represented 90% of the tin in the sludge. The crystals were heated to 700° C. and the $SnCl_4$ evolved was condensed and collected as an anhydrous, liquid product. The product weighed 70 g. and had a tin content of 45.1%, against the theoretical content of 45.53%. This was 65% of the tin in the hexachlorostannate.

EXAMPLE III

Crystals of $K_2SnCl_6$ were prepared as described in Example I and they were heated in a closed vessel to above 450° C. Tin tetrachloride vapour was rapidly evolved at 540° C. After sometime $SnCl_4$ evolution slowed down to a negligible amount. The temperature was then raised and $SnCl_4$ evolution proceeded at a high rate. This procedure was continued, raising the temperature each time $SnCl_4$ evolution fell off, until a temperature of 700° C. was reached. The total $SnCl_4$ collected after final heating at 700° C. was 97% of that present in the $K_2SnCl_6$. The potassium chloride remaining from the pyrolysis was dissolved in water for re-use in producing further $K_2SnCl_6$.

EXAMPLE IV 10 g. of tin powder were dissolved in 45 ml. of 37% hydrochloric acid. The solution was boiled and agitated vigorously so that stannous chloride formed was oxidized by air to stannic chloride. The stannic chloride solution was cooled and hydrogen peroxide was added thereto to ensure complete oxidation to stannic chloride. 20 g. of potassium chloride in 60 ml. of water were added to the stannic chloride solution to form $K_2SnCl_6$ and the resulting solution was evaporated until crystals of $K_2SnCl_6$ formed on cooling. The crystals were filtered off and, when thoroughly dried in an oven at 110° C., were weighed at 33 g. and analyzed for 28.91% Sn, representing 96% of the tin dissolved. The dry crystals were pyrolyzed as described in Example I to obtain an anhydrous, liquid $SnCl_4$ product weighing 20.5 g. and analyzing 45.49% Sn, representing 97% of the tin in the hexachlorostannate.

EXAMPLE V 10 g. of a 50:50 lead/tin solder were dissolved in 45 ml. of 37% hydrochloric acid. To insure oxidation of stannous chloride formed to stannic chloride the solution was boiled and agitated in air and was then cooled and hydrogen peroxide was added. Crystals of lead chloride which had formed were filtered from the cooled solution. 10 g. of potassium chloride in 30 ml. of water were then added to the stannic chloride solution to form $K_2SnCl_6$. The solution containing $K_2SnCl_6$ was evaporated and cooled to precipitate $K_2SnCl_6$ crystals. The crystals were filtered off and thoroughly dried at 110° C. The crystals weighed 15 g. and analyzed 28.86% Sn, representing 86% of the tin in the solder. The dry crystals were pyrolyzed as in Example I to obtain an anhydrous $SnCl_4$ product, which weighed 9 g. and analyzed 45.36% Sn, representing 95% of the tin in the hexachlorostannate.

EXAMPLE VI 12.5 g. of tin hydrate (containing 7.9 g. of tin by analysis) was dissolved in 75 ml. of concentrated hydrochloric acid to form stannic chloride in solution. 22.7 g. of cesium chloride dissolved in 20 ml. of water were added to the stannic chloride-containing solution and white crystals of cesium hexachlorostannate ($Cs_2SnCl_6$) formed immediately. These crystals were filtered off and thoroughly dried at 110° C. The crystals weighed 29.9 g. and analyzed 20.4% tin as compared with 19.9% theoretical for $Cs_2SnCl_6$. This represented 77% of the tin in solution. 22 g. of the dry crystals were pyrolyzed at increasing temperatures up to 700° C. to obtain anhydrous liquid tin tetrachloride, amounting to 65% of the tin in the hexachlorostannate crystals. Cesium chloride remained as a residue. It was noted that at above 700° C. the crystals sublimed with loss of CsCl in the vapour.

EXAMPLE VII

In this example rubidium hexachlorostannate ($Rb_2SnCl_6$)

was prepared by dissolving 11.45 g. of tin hydrate (containing 7 g. of tin by analysis) in 50 ml. of concentrated hydrochloric acid to form stannic chloride in solution and adding 30 ml. of solution containing 16.0 g. of rubidium chloride to the stannic chloride solution. The $Rb_2SnCl_6$ crystals which formed were thoroughly dried at 110° C. The dry crystals weighed 27.5 g. and analysis showed them to contain 24.0% tin compared with 23.6% theoretical for $Rb_2SnCl_6$, representing 94% of the tin in solution. The crystals were heated and pydolyzed to obtain anhydrous, liquid tin tetrachloride. A residue of rubidium chloride remained.

The present invention is seen to provide a simple and economic process for recovering a useful tin chemical in the form of anhydrous tin tetrachloride from scrap or waste materials containing tin in a form which can be taken up in hydrochloric acid. Furthermore, the present invention provides a novel procedure for treating stannic chloride-containing solutions for the complete removal of water therefrom to leave anhydrous tin tetrachloride.

What I claim as my invention is:

1. A process for the treatment of an aqueous solution containing stannic chloride and residual impurities for removal of water therefrom and recovery of pure anhydrous tin tetrachloride which comprises reacting said aqueous solution containing stannic chloride with the chloride of a metal from the group comprising potassium, rubidium and cesium to form a second solution containing hexachlorostannate of said metal and residual impurities, removing crystals of said hexachlorostannate from the second solution and from the residual impurities while substantially avoiding pyrolysis thereof, heating and pyrolyzing said crystals in the dry state at above about 450° C. to form tin tetrachloride vapour and condensing said vapour to form a product of anhydrous liquid tin tetrachloride.

2. A process as claimed in claim 1 wherein the stannic chloride-containing aqueous solution is reacted with potassium chloride to form potassium hexachlorostannate in the second solution and the second solution is subjected to evaporation to form crystals of potassium hexachlorostannate.

3. A process as claimed in claim 2 wherein excess potassium chloride in amounts of up to about 50% excess over that required to react with the stannic chloride is added to the stannic chloride-containing solution.

4. A process as claimed in claim 2 wherein the second solution is evaporated to precipitate potassium hexachlorostannate crystals at not over 400° C.

5. A process as claimed in claim 4 wherein evaporation occurs at not over 300° C.

6. A process as claimed in claim 2 wherein heating and pyrolysis of the crystals is carried out at up to 700° C.

7. A process as claimed in claim 6 wherein heating and pyrolysis of the crystals is carried out at above 540° C.

8. A process as claimed in claim 2 wherein heating and pyrolysis of the crystals is carried out by increasing the temperature in stages to about 700° C.

9. A process as claimed in claim 2 wherein potassium chloride remaining from the heating and pyrolizing step is returned for re-use in the process for reacting with further amounts of stannic chloride-containing solution.

10. A process for treating a material containing tin in a form which can be dissolved in hydrochloric acid for recovery of anhydrous tin tetrachloride therefrom which comprises reacting said material with hydrochloric acid to form a first solution containing stannic chloride from the tin in said material, reacting said first solution with the chloride of a metal from the group comprising potassium, rubididum and cesium to form a second solution containing hexachlorostannate of said metal and residual impurities, removing crystals of said hexachlorostannate from the second solution and from the residual impurities while substantially avoiding pyrolysis thereof, heating and pyrolizing said crystals in the dry state at above about 450° C. to form tin tetrachloride vapour and condensing said vapour to form a product of anhydrous liquid tin tetrachloride.

11. A process as claimed in claim 10 wherein the first solution is reacted with potassium chloride to form potassium hexachlorostannate in the second solution and the second solution is subjected to evaporation to form crystals of potassium hexachlorostannate.

12. A process as claimed in claim 11 wherein the tin-containing material is treated with hot hydrochloric acid in amounts of at least 10% excess over that required to react with the tin in the material, the first solution is reacted with excess potassium chloride over that required to react with the stannic chloride in the first solution, the second solution is subjected to evaporation at not over 400° C. and the hexachlorostannate crystals are heated at between 540° C. and 700° C. to form tin tetrachloride.

13. A process as claimed in claim 12 wherein at least about 40% excess hydrochloric acid is used.

14. A process as claimed in claim 11 wherein potassium hexachlorostannate crystals formed in the evaporation step are removed from hydrochloric acid-containing solution remaining, the hydrochloric acid solution is returned for reaction with further tin-containing material and the crystals are dried to remove water therefrom.

15. A process as claimed in claim 11 wherein the tin-containing material contains metallic tin, stannous chloride is formed upon reacting said material with hydrochloric acid and said stannous chloride is oxidized to stanic chloride in the first solution.

16. A process as claimed in claim 11 wherein up to about 40% excess hydrochloric acid is used in forming the first solution, up to about 50% excess potassium chloride is used to form the second solution, potassium hexachlorostannate crystals formed in the evaporation step are removed from hydrochloric acid-containing solution remaining, the hydrochloric acid solution is returned for reaction with further tin-containing material, the potassium hexachlorostannate crystals are dried to remove water therefrom, the crystals are heated and pyrolyzed at above 540° C. and the potassium chloride remaining from the heating and pyrolyzing step is returned for re-use in the process for reacting with further amounts of first solution.

17. A process as claimed in claim 16 wherein heating and pyrolysis of the crystals is carried out by increasing the temperature in stages to about 700° C.

References Cited

UNITED STATES PATENTS

| | | | |
|---|---|---|---|
| 810,454 | 1/1906 | Acker | 23—98 |
| 1,737,140 | 11/1929 | Bischitzky | 23—98 |
| 1,777,132 | 9/1930 | Smith | 23—98 |
| 2,868,623 | 1/1959 | Vittands | 23—98 |

OTHER REFERENCES

J. W. Mellor's book "A Comprehensive Treatise on Inorganic and Theoretical Chemistry", vol. 7, pp. 427, 428, 448 and 449. Copy received in U.S. Pat. Office Feb. 11, 1927. Longmans, Green & Co., New York, publishers.

EDWARD STERN, Primary Examiner

U.S. Cl. X.R.

23—53